(12) United States Patent
Diab et al.

(10) Patent No.: US 8,284,799 B2
(45) Date of Patent: Oct. 9, 2012

(54) METHOD AND SYSTEM FOR SUPPORTING A VARIABLE AND ENERGY EFFICIENT DATA RATE USING A DUTY CYCLING TECHNIQUE AND MULTIPLE POWER STATES ON AN ETHERNET LINK

(75) Inventors: Wael William Diab, San Francisco, CA (US); Howard Frazier, Pleasanton, CA (US)

(73) Assignee: Broadcom Corporation, Irvine, CA (US)

( * ) Notice: Subject to any disclaimer, the term of this patent is extended or adjusted under 35 U.S.C. 154(b) by 83 days.

(21) Appl. No.: 12/200,499

(22) Filed: Aug. 28, 2008

(65) Prior Publication Data
US 2009/0154593 A1    Jun. 18, 2009

Related U.S. Application Data

(60) Provisional application No. 61/014,253, filed on Dec. 17, 2007, provisional application No. 61/014,265, filed on Dec. 17, 2007, provisional application No. 61/014,278, filed on Dec. 17, 2007, provisional application No. 61/014,293, filed on Dec. 17, 2007.

(51) Int. Cl.
*H04J 3/16* (2006.01)
(52) U.S. Cl. ........................................ 370/468
(58) Field of Classification Search ................. None
See application file for complete search history.

(56) References Cited

U.S. PATENT DOCUMENTS

| | | | |
|---|---|---|---|
| 5,381,450 A | 1/1995 | Lane | |
| 6,085,248 A * | 7/2000 | Sambamurthy et al. | 709/229 |
| 6,278,864 B1 * | 8/2001 | Cummins et al. | 455/73 |
| 6,442,174 B1 | 8/2002 | Lin | |
| 6,483,870 B1 | 11/2002 | Locklear, Jr. et al. | |
| 6,587,473 B2 | 7/2003 | Terry et al. | |
| 6,731,692 B1 | 5/2004 | Bhoja | |
| 6,795,450 B1 | 9/2004 | Mills et al. | |

(Continued)

FOREIGN PATENT DOCUMENTS

EP    1 473 870    11/2004

(Continued)

OTHER PUBLICATIONS

Bennett et al., "Energy Efficient Ethernet", [Online] IEEE 802 Tutorial, Jul. 16, 2007, http://www.ieee802.org/802_tutorials/july07/IEEE-tutorial-energy-efficient-ethernet.pdf.

(Continued)

*Primary Examiner* — Otis L Thompson, Jr.
(74) *Attorney, Agent, or Firm* — Farjami & Farjami LLP

(57) ABSTRACT

Aspects of a method and system for supporting a variable and energy efficient data rate using a duty cycling technique and multiple power states on an Ethernet link are provided. In this regard, a data rate on a network link may be duty cycled based on characteristics of data communicated over it. The network link may operate at a first data rate for a first portion of the time interval and may operate at a second data rate for a second portion of the time interval. The duration of each portion of the time interval and/or the data rate during each portion of the time interval may be adjusted to control the duty cycling. Power consumed in a device connected to the network link may be controlled based on the duty cycling of the link.

20 Claims, 8 Drawing Sheets

U.S. PATENT DOCUMENTS

| | | | |
|---|---|---|---|
| 6,856,597 B1 | 2/2005 | Scott | |
| 7,050,517 B1 | 5/2006 | Sallaway et al. | |
| 7,308,058 B2 | 12/2007 | Zerbe et al. | |
| 2001/0033611 A1 | 10/2001 | Grimwood | |
| 2002/0136231 A1 | 9/2002 | Leatherbury | |
| 2003/0053493 A1 | 3/2003 | Graham Mobley | |
| 2003/0078006 A1* | 4/2003 | Mahany | 455/63 |
| 2003/0191854 A1 | 10/2003 | Hsu | |
| 2006/0018274 A1* | 1/2006 | Twitchell, Jr. | 370/328 |
| 2006/0034295 A1 | 2/2006 | Cherukuri et al. | |
| 2006/0140218 A1* | 6/2006 | Winterton | 370/476 |
| 2007/0127581 A1* | 6/2007 | Connor et al. | 375/257 |
| 2007/0280239 A1 | 12/2007 | Lund | |
| 2008/0201626 A1 | 8/2008 | Sturm | |
| 2008/0225841 A1 | 9/2008 | Conway et al. | |
| 2008/0313508 A1* | 12/2008 | Starr | 714/701 |
| 2009/0097427 A1 | 4/2009 | Diab | |
| 2009/0097442 A1 | 4/2009 | Diab | |
| 2009/0097481 A1 | 4/2009 | Diab | |
| 2009/0097500 A1 | 4/2009 | Diab | |
| 2009/0154355 A1 | 6/2009 | Diab | |
| 2009/0154455 A1 | 6/2009 | Diab | |
| 2009/0154490 A1 | 6/2009 | Diab | |
| 2009/0154500 A1 | 6/2009 | Diab | |
| 2009/0154593 A1 | 6/2009 | Diab | |
| 2009/0180529 A1 | 7/2009 | Agazzi et al. | |

FOREIGN PATENT DOCUMENTS

| | | |
|---|---|---|
| EP | 1484876 | 12/2004 |
| EP | 1 494 407 | 1/2005 |
| GB | 2337672 | 11/1999 |
| WO | WO 00/31923 | 6/2000 |

OTHER PUBLICATIONS

Grow, "802.1 and Energy Efficient Ethernet", [Online] Sep. 11, 2007, pp. 1-6, http://www.ieee802.org/3/eee_study/public/sep07/grow_1_0907.pdf.

Teener, "Audio/Video Bridging for Home Networks (IEEE 802.1 AV Bridging Task Group)" [Online] Jun. 1, 2007, http://www.ieee802.org/3/eee_study/public/jul07/teener_1_0707.pdf.

Gupta et al., "Dynamic Ethernet Link Shutdown for Energy Conservation on Ethernet Links." IEEE, Jun. 24, 2007. XP002524616.

Wael Diab, "Energy Efficient Ethernet and 802.1." Nov. 2007. XP002524617.

* cited by examiner

METHOD AND SYSTEM FOR SUPPORTING A VARIABLE AND ENERGY EFFICIENT DATA RATE USING A DUTY CYCLING TECHNIQUE AND MULTIPLE POWER STATES ON AN ETHERNET LINK

CROSS-REFERENCE TO RELATED APPLICATIONS/INCORPORATION BY REFERENCE

This patent application makes reference to, claims priority to and claims benefit from:
U.S. Provisional Patent Application Ser. No. 61/014,253 filed on Dec. 17, 2007;
U.S. Provisional Patent Application Ser. No. 61/014,265 filed on Dec. 17, 2007;
U.S. Provisional Patent Application Ser. No. 61/014,278 filed on Dec. 17, 2007; and
U.S. Provisional Patent Application Ser. No. 61/014,293 filed on Dec. 17, 2007.

This patent application also makes reference to:
U.S. patent application Ser. No. 12/200,402 filed on even date herewith;
U.S. patent application Ser. No. 12/200,551 filed on even date herewith; and
U.S. patent application Ser. No. 12/200,653 filed on even date herewith.

Each of the above stated applications is hereby incorporated herein by reference in its entirety.

FIELD OF THE INVENTION

Certain embodiments of the invention relate to a method and system for networking. More specifically, certain embodiments of the invention relate to a method and system for supporting a variable and energy efficient data rate using a duty cycling technique and multiple power states on an Ethernet link.

BACKGROUND OF THE INVENTION

With the increasing popularity of electronics such as desktop computers, laptop computers, and handheld devices such as smart phones and PDA's, communication networks, and in particular Ethernet networks, are becoming an increasingly popular means of exchanging data of various types and sizes for a variety of applications. In this regard, Ethernet networks are increasingly being utilized to carry, for example, voice, data, and multimedia. Accordingly more and more devices are being equipped to interface to Ethernet networks.

As the number of devices connected to data networks increases and higher data rates are required, there is a growing need for new transmission technologies which enable higher data rates. Conventionally, however, increased data rates often results in significant increases in power consumption. In this regard, as an increasing number of portable and/or handheld devices are enabled for Ethernet communications, battery life may be a concern when communicating over Ethernet networks. Accordingly, ways of reducing power consumption when communicating over Ethernet networks may be needed.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for supporting a variable and energy efficient data rate using a duty cycling technique and multiple power states on an Ethernet link, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for supporting a variable and energy efficient data rate using a duty cycling technique and multiple power states on an Ethernet link. In certain embodiments of the invention, a network link may be duty cycled based on characteristics of data communicated over it such that data may be communicated over the link at a first data rate for a first portion of a specified time interval and may be communicated over the link at a second data rate for a second portion of the specified time interval. The duration of each portion of the time interval and/or the data rate during each portion of the time interval may be adjusted to control the duty cycling. The characteristics may comprise an amount of, a type of, and/or an application associated with, the data communicated over the network. The first data rate may be a zero data rate and the second data rate may be a maximum data rate that may be supported by the network link. The data rate may be controlled by adjusting a number of active physical channels in the network link, a signal constellation utilized for representing data on the network link, a number of pulse amplitude modulation levels utilized for signaling on the network link, and/or one or more inter-frame gaps on the network link. Power consumed in a device connected to the network link may be controlled based on the duty cycling of the link. In this regard, components in the device may be powered down during the first portion of the time interval.

Figure 1:
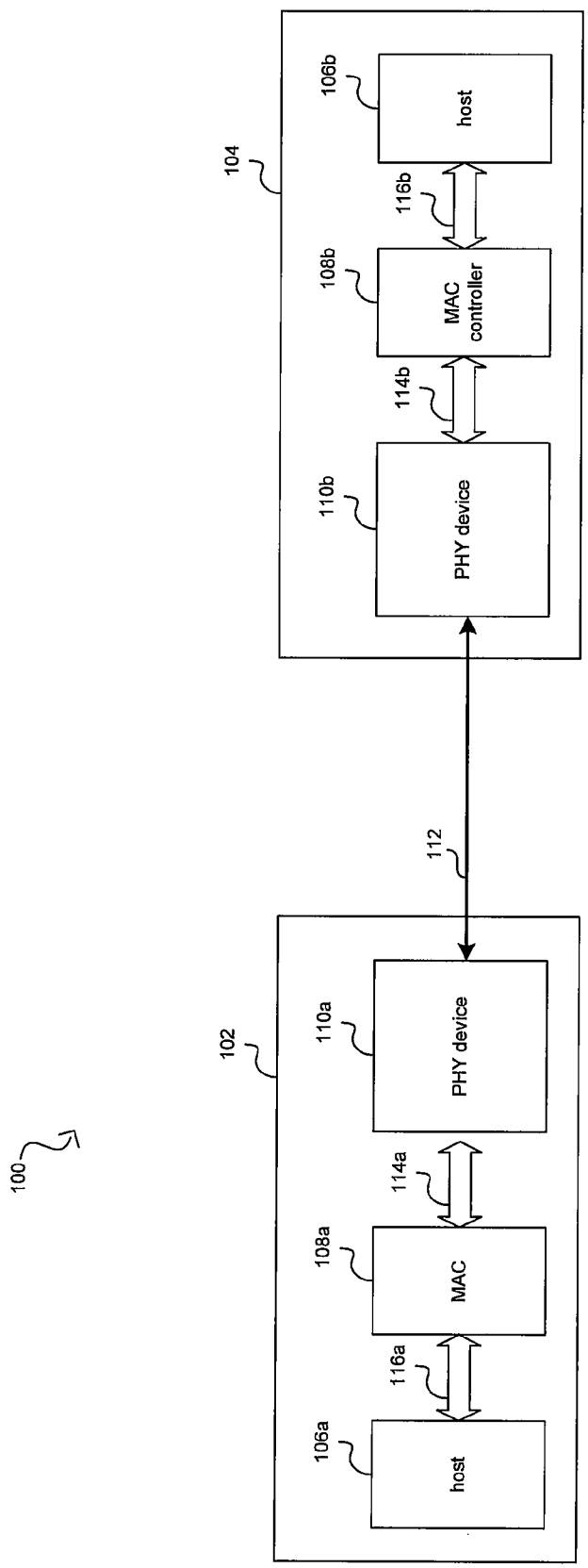
FIG. 1 is a block diagram illustrating an Ethernet connection between two network nodes, in accordance with an embodiment of the invention.

FIG. 1 is a block diagram illustrating an Ethernet connection between two network nodes, in accordance with an embodiment of the invention. Referring to FIG. 1, there is shown a network 100 that comprises network nodes 102 and 104. Notwithstanding the embodiment depicted in FIG. 1, aspects of the invention may be utilized in networks of any size, topology, and/or technology. The nodes 102 and 104 may communicate via a link 112. The link 112 may comprise up to four or more physical channels, each of which may, for example, comprise an unshielded twisted pair (UTP). The nodes 102 and 104 may communicate via two or more physical channels comprising the link 112. For example, Ethernet over twisted pair standards 10 BASE-T and 100 BASE-TX may utilize two pairs of UTP while Ethernet over twisted pair standards 1000 BASE-T and 10 GBASE-T may utilize four pairs of UTP. In this regard, however, aspects of the invention may enable varying the number of physical channels via which data is communicated.

In an exemplary embodiment of the invention, the nodes 102 and/or 104 may comprise a twisted pair PHY capable of operating at one or more standard rates such as 10 Mbps, 100 Mbps, 1 Gbps, and 10 Gbps (10 BASE-T, 100 GBASE-TX, 1 GBASE-T, and/or 10 GBASE-T); potentially standardized rates such as 40 Gbps and 100 Gbps; and/or non-standard rates such as 2.5 Gbps and 5 Gbps.

In an exemplary embodiment of the invention, the nodes 102 and/or 104 may comprise a backplane PHY capable of operating at one or more standard rates such as 10 Gbps (10 GBASE-KX4 and/or 10 GBASE-KR); and/or non-standard rates such as 2.5 Gbps and 5 Gbps.

In an exemplary embodiment of the invention, the nodes 102 and/or 104 may comprise an optical PHY capable of operating at one or more standard rates such as 10 Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY.

In addition, the link partners, node 102 and/or 104 may support multi-lane topologies such as 40 Gbps CR4, ER4, KR4; 100 Gbps CR10, SR10 and/or 10 Gbps LX4 and CX4. Also, serial electrical and copper single channel technologies such as KX, KR, SR, LR, LRM, SX, LX, CX, BX10, LX10 may be supported. Non standard speeds and non-standard technologies, for example, single channel, two channel or four channels may also be supported. More over, TDM technologies such as PON at various speeds may be supported by the link partner nodes 102 and/or 104.

The node 102 may comprise a host 106a, a medium access control (MAC) controller 108a, and a PHY device 104a. The node 104 may comprise a host 106b, a MAC controller 108b, and a PHY device 110b. Notwithstanding, the invention is not limited in this regard. The nodes 102 and 104 may each comprise at least one network port which may enable the nodes 102 and 104 to communicate via the link 112. In this regard, each network port may comprise suitable logic, circuitry, and/or code operable to enable transmission and/or reception of data over a corresponding network link, such as the link 112. In the network nodes 102 and 104, components of one or more network ports may reside in one or more of the host 106, the media access controller 108, and the PHY device 110. Moreover, various components of a network node may be associated with a single port or may be associated with a plurality of ports. Notwithstanding the embodiment depicted in FIG. 1, each of the nodes 102 and 104 may comprise a plurality of ports enabled to communicate over a corresponding plurality of links.

In various embodiments of the invention, the node 102 and/or 104 may comprise, for example, networking devices such as personal computers, handheld devices, servers, switches, routers, and bridges. In various embodiments of the invention, the node 102 and/or 104 may comprise, for example, A/V equipment such as microphones, instruments, sound boards, sound cards, video cameras, media players, graphics cards, or other audio and/or video devices. Additionally, the nodes 102 and 104 may be enabled to utilize Audio/Video Bridging and/or Audio/video bridging extensions (collectively referred to herein as audio video bridging or AVB) for the exchange of multimedia content and associated control and/or auxiliary data.

The PHY devices 110a and 110b may each comprise suitable logic, circuitry, and/or code that may enable communication, for example, transmission and reception of data, between the node 102 and the node 104. The PHY devices 110a and 110b may support, for example, Ethernet over copper, Ethernet over fiber, and/or backplane Ethernet operations. The PHY devices 110a and 110b may enable multi-rate communications, such as 10 Mbps, 100 Mbps, 1000 Mbps (or 1 Gbps), 2.5 Gbps, 4 Gbps, 10 Gbps, or 40 Gbps, for example. In this regard, the PHY devices 110a and 110b may support standard-based data rates and/or non-standard data rates. Moreover, the PHY devices 110a and 110b may support standard Ethernet link lengths or ranges of operation and/or extended ranges of operation. The PHY devices 110a and 110b may enable communication between the node 102 and the node 104 by utilizing a link discovery signaling (LDS) operation that enables detection of active operations in the other node. In this regard the LDS operation may be configured for supporting a standard Ethernet operation and/or an extended range Ethernet operation. The PHY devices 110a and 110b may also support autonegotiation for identifying and selecting communication parameters such as speed and duplex mode.

In various embodiments of the invention, the PHY devices 110a and 110b may comprise suitable logic, circuitry, and/or code that may enable transmission and/or reception utilizing a first duty cycling scheme in one direction and transmission and/or reception utilizing a second duty cycling scheme in the other direction. For example, the data rates and duty cycle period in one direction may be different from the data rates and duty cycle period in the other direction.

The data transmitted and/or received by the PHY devices 110a and 110b may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical layer, may provide services to layer 2 and layer 2 may provide services to layer 3. The data transmitted may comprise frames of Ethernet media independent interface (MII) data which may be delimited by start of stream and end of stream delimiters, for example.

In an exemplary embodiment of the invention illustrated in FIG. 1, the hosts 106a and 106b may represent layer 3 and above, the MAC controllers 108a and 108b may represent layer 2 and above and the PHY devices 110a and 110b may represent the operability and/or functionality of layer 1 or the physical layer. In this regard, the PHY devices 110a and 110b may be referred to as Physical layer transmitters and/or receivers, physical layer transceivers, PHY transceivers, PHYceivers, or PHY, for example. The hosts 106a and 106b may comprise suitable logic, circuitry, and/or code that may enable operability and/or functionality of the five highest functional layers for data packets that are to be transmitted over the link 112. Since each layer in the OSI model provides a service to the immediately higher interfacing layer, the MAC controllers 108a and 108b may provide the necessary services to the hosts 106a and 106b to ensure that packets are suitably formatted and communicated to the PHY devices 110a and 110b. During transmission, each layer may add its own header to the data passed on from the interfacing layer above it. However, during reception, a compatible device having a similar OSI stack may strip off the headers as the message passes from the lower layers up to the higher layers.

The PHY devices 110a and 110b may be configured to handle all the physical layer requirements, which include, but are not limited to, packetization, data transfer and serialization/deserialization (SERDES), in instances where such an operation is required. Data packets received by the PHY devices 110a and 110b from MAC controllers 108a and 108b, respectively, may include data and header information for each of the above six functional layers. The PHY devices 110a and 110b may be configured to encode data packets that are to be transmitted over the link 112 and/or to decode data packets received from the link 112.

The MAC controller 108a may comprise suitable logic, circuitry, and/or code that may enable handling of data link layer, layer 2, operability and/or functionality in the node 102. Similarly, the MAC controller 108b may comprise suitable logic, circuitry, and/or code that may enable handling of layer 2 operability and/or functionality in the node 104. The MAC controllers 108a and 108b may be configured to implement Ethernet protocols, such as those based on the IEEE 802.3 standard, for example. Notwithstanding, the invention is not limited in this regard.

The MAC controller 108a may communicate with the PHY device 110a via an interface 114a and with the host 106a via a bus controller interface 116a. The MAC controller 108b may communicate with the PHY device 110b via an interface 114b and with the host 106b via a bus controller interface 116b. The interfaces 114a and 114b correspond to Ethernet interfaces that comprise protocol and/or link management control signals. The interfaces 114a and 114b may be multi-rate capable interfaces and/or media independent interfaces (MII). The bus controller interfaces 116a and 116b may correspond to PCI or PCI-X interfaces. Notwithstanding, the invention is not limited in this regard.

In operation, the amount of data generated by the node(s) 102 and/or 104 during a given time interval may be significantly less than a maximum data rate at which the nodes 102 and 104 may be enabled to communicate over the link 112. Consequently, continuously operating the link 112 at its maximum data rate may be inefficient in terms of energy consumption due, at least in part, to IDLE symbols being transmitted on the link for significant period of time and due to logic, circuitry, and/or code in the node(s) 102 and/or 104 being continuously operated in a state to support the maximum data rate of the link. Thus, certain aspects of the invention may enable improving the power efficiency of the network 100 by duty cycling the data rate of the link 112 between two or more data rates to match the data rate at which traffic is being generated.

In some instances, data, such as multimedia streams, may inherently have a cyclic and/or periodic pattern. Accordingly, various aspects of the invention may be enabled to duty cycle the data rate on the link 112 to match the pattern at which the multimedia traffic may be generated. In some instances, data arriving at the MAC from higher layers may not be inherently bursty, but may be shaped via buffering, such that it may be conveyed to the physical layer in a cyclic or periodic pattern. In such instances, a resulting pattern of traffic out of the buffers may be determined, for example, by latency requirements of the data. Accordingly, the data rate on the link 112 may be duty cycled to match the pattern at which data is buffered and subsequently conveyed to the physical layer. Thus, various logic, circuitry, and/or code within the nodes 102 and 104 may be operable to duty cycle a data rate of the link 112 such that the time averaged data rate of the link 112 meets the time averaged rate at which data to be communicated over the link 112 is generated. In various embodiments of the invention, the trade off between energy utilized for buffering data and energy utilized for transmitting data may be balanced so as to optimize power consumption of the nodes 102 and 104.

In an exemplary embodiment of the invention, the link 112 may be operated at a maximum supported data rate for a portion of a time interval and may go to a zero data rate for a remaining portion of the time interval. In another exemplary embodiment of the invention, the nodes 102 and 104 may communicate at a high(er) intermediate data rate for a portion of a time interval and may go to a low(er) intermediate data rate for a remaining portion of the time interval. In another exemplary embodiment of the invention, the nodes 102 and 104 may communicate at a maximum supported data rate for a portion of a time interval and may go to a low(er) intermediate data rate for a remaining portion of the time interval. In another exemplary embodiment of the invention, the nodes 102 and 104 may communicate at a high(er) intermediate data rate for a portion of a time interval and may go to zero data rate for a remaining portion of the time interval. The data rate on the link 112 may be controlled via one or more exemplary methods comprising: adjusting a number of active physical channels on the link 112, adjusting a signal constellation utilized for representing data on the link 112, reducing the number of PAM levels utilized for signaling on the link 112, adjusting the inter-frame gap (IFG), and adjusting a symbol rate on the link 112. Operating at a low(er) data rate may reduce the amount of energy consumed in generating and transmitting IDLE symbols and may additionally enable various logic, circuitry, and/or code in the nodes 102 and 104 to be disabled, slowed down, or otherwise placed into a low(er) power state.

To ensure reliable communications over the link 112, each of the nodes 102 and 104 may need to adjust and/or monitor various parameters and/or circuitry to account for variables such as the type of cabling over which data is being communicated and the environmental conditions (e.g. temperature) surrounding the cabling. This process may be referred to as "training" and may adapt a link partner to current link conditions such that reliable communications may be established on a link. For example, training may comprise configuring various parameters, circuitry, and or timing loops in one or both of the nodes 102 and 104 such that the nodes 102 and 104 may be synchronized and/or reliably communicate over one or more physical channels of the link 112. In this manner, training may ensure reliable operation of functions such as echo cancellation, far-end crosstalk cancellation, and near-end crosstalk cancellation may be performed. Accordingly, during time periods when no data may be communicated over the link 112, a minimal amount of logic, circuitry, and/or code in the nodes 102 and 104 may be powered up (enabled) such that a minimal amount of energy and/or information may be exchanged between the nodes 102 and 104. This may eliminate a need for re-training upon transitioning back to the a high(er) or maximum data rate.

Figure 2:
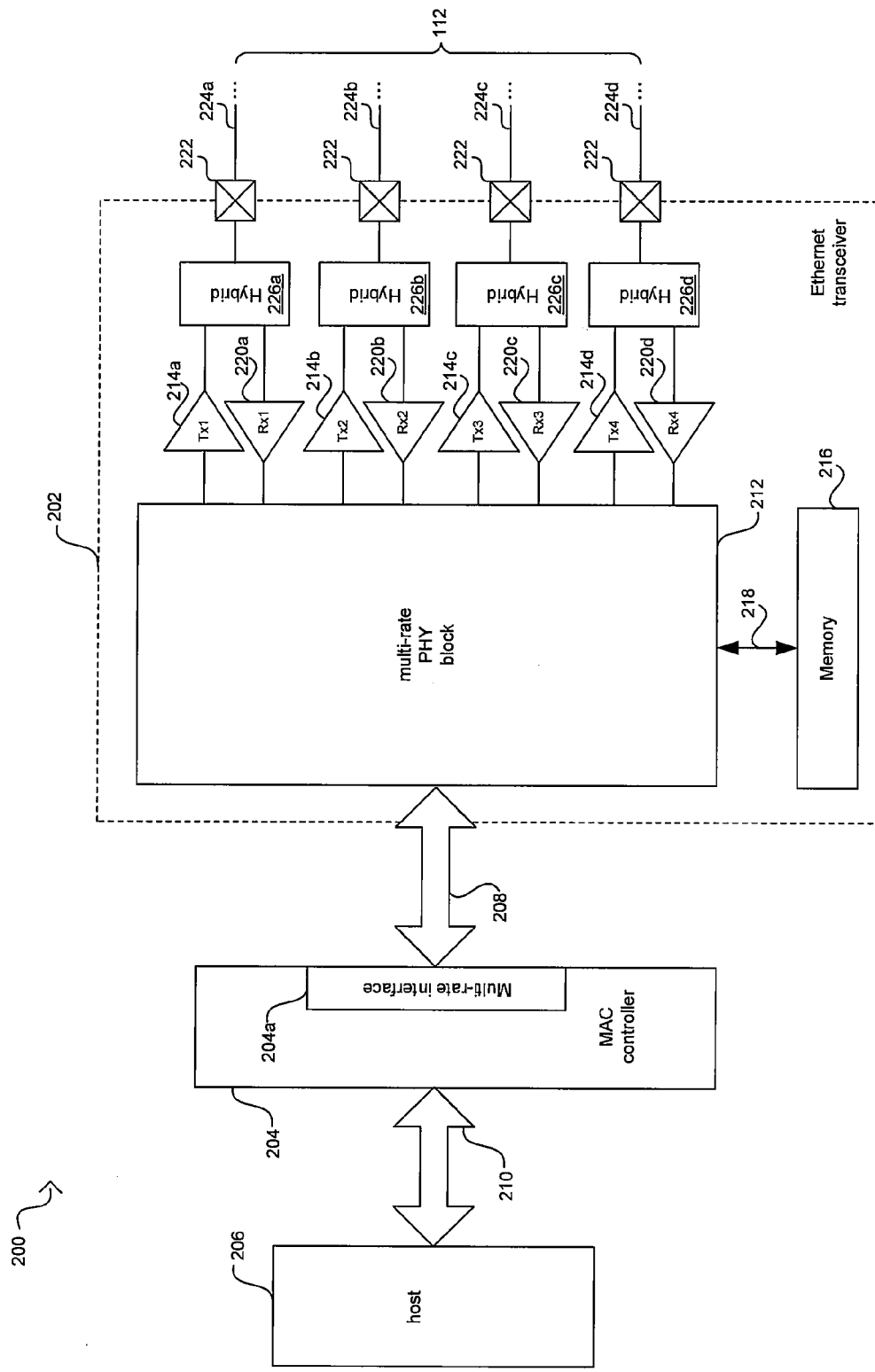
FIG. 2 is a block diagram illustrating an exemplary Ethernet over twisted pair PHY device architecture comprising a multi-rate capable physical layer block, in accordance with an embodiment of the invention.

FIG. 2 is a block diagram illustrating an exemplary Ethernet over twisted pair PHY device architecture comprising a multi-rate capable physical layer block, in accordance with an embodiment of the invention. Referring to FIG. 2, there is shown a network node 200 which may comprises an Ethernet over twisted pair PHY device 202, a MAC controller 204, a host 206, an interface 208, and a bus controller interface 210. The PHY device 202 may be an integrated device which may comprise a multi-rate capable physical layer block 212, one or more transmitters 214, one or more receivers 220, a memory 216, a memory interface 218, and one or more input/output interfaces 222.

The PHY device 202 may be an integrated device that comprises a multi-rate capable physical layer block 212, one or more transmitters 214, one or more receivers 220, a memory 216, a memory interface 218, and one or more input/output interfaces 222. The operation of the PHY device 202 may be the same as or substantially similar to that of the PHY devices 110a and 110b disclosed in FIG. 1. In this regard, the PHY device 202 may provide layer 1 (physical layer) operability and/or functionality that enables communication with a remote PHY device. Similarly, the operation of the MAC controller 204, the host 206, the interface 208, and the bus controller 210 may be the same as or substantially similar to the respective MAC controllers 108a and 108b, hosts 106a and 106b, interfaces 114a and 114b, and bus controller interfaces 116a and 116b as described in FIG. 1. The MAC controller 204 may comprise a multi-rate capable interface 204a that may comprise suitable logic, circuitry, and/or code to enable communication with the PHY device 202 at a plurality of data rates via the interface 208.

The multi-rate capable physical layer block 212 in the PHY device 202 may comprise suitable logic, circuitry, and/or code that may enable operability and/or functionality of physical layer requirements. In this regard, the multi-rate capable physical layer block 212 may enable generating the appropriate link discovery signaling utilized for establishing communication with a remote PHY device in a remote network node. The multi-rate capable physical layer block 212 may communicate with the MAC controller 204 via the interface 208. In one aspect of the invention, the interface 208 may be a media independent interface (MII) and may be configured to utilize a plurality of serial data lanes for receiving data from the multi-rate capable physical layer block 212 and/or for transmitting data to the multi-rate capable physical layer block 212. The multi-rate capable physical layer block 212 may be configured to operate in one or more of a plurality of communication modes, where each communication mode may implement a different communication protocol. These communication modes may include, but are not limited to, Ethernet over twisted pair standards 10 BASE-T, 100 BASE-TX, 1000 BASE-T, 10 GBASE-T, and other similar protocols that utilize multiple physical channels between network nodes. The multi-rate capable physical layer block 212 may be configured to operate in a particular mode of operation upon initialization or during operation. For example, auto-negotiation may utilize the FLP bursts to establish a rate (e.g. 10 Mbps, 100 Mbps, 1000 Mbps, or 10 Gbps) and mode (half-duplex or full-duplex) for transmitting information.

The multi-rate capable physical layer block 212 may be coupled to memory 216 through the memory interface 218, which may be implemented as a serial interface or a bus. The memory 216 may comprise suitable logic, circuitry, and/or code that may enable storage or programming of information that includes parameters and/or code that may effectuate the operation of the multi-rate capable physical layer block 212. The parameters may comprise configuration data and the code may comprise operational code such as software and/or firmware, but the information need not be limited in this regard. Moreover, the parameters may include adaptive filter and/or block coefficients for use, for example, by the multi-rate capable physical layer block 212 and/or the hybrids 226.

Each of the transmitters 214a, 214b, 214c, 214d may comprise suitable logic, circuitry, and/or code that may enable transmission of data from the node 200 to a remote node via, for example, the link 112 in FIG. 1. The receivers 220a, 220b, 220c, 220d may comprise suitable logic, circuitry, and/or code that may enable receiving data from a remote node. Each of the transmitters 214a, 214b, 214c, 214d and receivers 220a, 220b, 220c, 220d in the PHY device 202 may correspond to a physical channel that may comprise the link 112. In this manner, a transmitter/receiver pair may interface with each of the physical channels 224a, 224b, 224c, 224d. In this regard, the transmitter/receiver pairs may be enabled to provide the appropriate communication rate and mode for each physical channel.

The input/output interfaces 222 may comprise suitable logic circuitry, and/or code that may enable the PHY device 202 to impress signal information onto a physical channel, for example a twisted pair of the link 112 disclosed in FIG. 1. Consequently, the input/output interfaces 222 may, for example, provide conversion between differential and single-ended, balanced and unbalanced, signaling methods. In this regard, the conversion may depend on the signaling method utilized by the transmitter 214, the receiver 220, and the type of medium of the physical channel. Accordingly, the input/output interfaces 222 may comprise one or more baluns and/or transformers and may, for example, enable transmission over a twisted pair. Additionally, the input/output interfaces 222 may be internal or external to the PHY device 202. In this regard, if the PHY device 202 comprises an integrated circuit, then "internal" may, for example, refer to being "on-chip" and/or sharing the same substrate. Similarly, if the PHY device 202 comprises one or more discrete components, then "internal" may, for example, refer to being on the same printed circuit board or being within a common physical package.

The PHY device 202 may be enabled to transmit and receive simultaneously over up to four or more physical links. Accordingly, the node 200 may comprise a number of hybrids 226 corresponding to the number of physical links. Each hybrid 226 may comprise suitable logic, circuitry, and/or code that may enable separating transmitted and received signals from a physical link. For example, the hybrids may comprise echo cancelers, far-end crosstalk (FEXT) cancelers, and/or near-end crosstalk (NEXT) cancelers. Each hybrid 226 in the node 300 may be communicatively coupled to an input/output interface 222.

In operation, the node 200 may communicate with a remote node via the link 112. For example, for 10 Gbps Ethernet, the node 200 may transmit data to and receive data from a remote node via one or more of the physical channels 224a, 224b, 224c, and 224d. In this regard, when there is no data for the node 200 to transmit, then it may transmit IDLE symbols to keep itself and/or the remote partner "trained". In this manner, power consumption of a network may be largely independent of the amount of actual data being transmitted over the network. Accordingly, controlling the data rate over the link 112 may enable the node 200 to transmit fewer IDLE symbols and thus communicate in a more energy efficient manner. In this regard, the node 200 may transmit data over the link 112 at different data rates during different portions of a time interval.

In various embodiments of the invention, the node 200 may disable, or put into a low(er) power state, one or more of the physical channels 224, when those one or more physical channels are not required to meet current and/or future demand of the link. In this manner, transmitters 214, receivers 220, hybrids 226, and/or portions of the multi-rate capable physical layer block 212 associated with the unused physical channels may be put into a low(er) power state. A physical channel not utilized to convey information and/or in a low(er) power state may be referred to as inactive, while a physical channel utilized to convey information and/or not in a low(er) power state may be referred to as active. In various embodiments of the invention, a channel in a low(er) power state may convey little or no data, convey IDLE symbols, and/or convey other energy. In some instances, aspects of the invention may enable placing all channels of a link into a low(er) power state.

In various embodiments of the invention, a data rate of a communication link may be controlled by adjusting the size of a signal constellation. In this regard, a signal constellation utilized to transmit signals may be reduced to provide lower data rates. For example, a subset of a larger signal constellation may be chosen such that encoding and decoding signals may be less hardware and/or processor intensive. In this manner, portions of the multi-rate capable physical layer block 212 may consume less energy when encoding data utilizing a smaller or different signal constellation.

In various embodiments of the invention, a data rate of a communication link may be controlled by adjusting the PAM levels utilized for signaling. For example, in instances such as 10 Gbps Ethernet, where data it typically encoded utilizing a PAM-16 scheme, aspects of the invention may enable switching to PAM-8 or PAM-4 for lower data rates. In this regard, utilizing fewer PAM levels, and thus smaller voltages, may reduce power consumption in the system 200 as well as energy consumed on the link 212.

In various embodiments of the invention, a data rate of a communication link may be controlled by controlling the inter-frame gap time or inter-packet gap (IPG) time. In this regard, increasing the IFG may reduce the data rate while decreasing the IFG may increase the data rate.

Figure 3A:
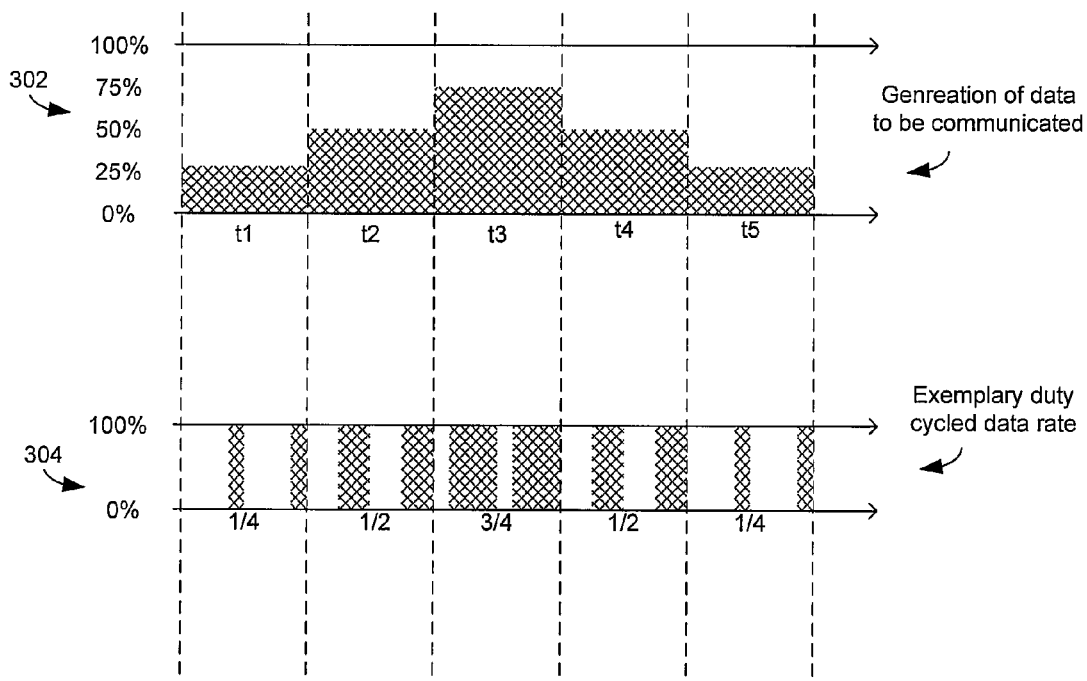
FIG. 3A is a diagram illustrating duty cycling a data rate of a network link between a zero data rate and a maximum supported data rate of the link, in accordance with an embodiment of the invention.

FIG. 3A is a diagram illustrating duty cycling a data rate of a network link between a zero data rate and a maximum supported data rate of the link, in accordance with an embodiment of the invention. Referring to FIG. 3A, there is shown a graph 302 depicting data being generated and a graph 304 depicting a corresponding duty cycled data rate on an associated link. The data may be generated in one or more nodes which may communicate over a common link, such as the nodes 102 and 104. Although FIG. 3A depicts the link 112 being duty cycled between two data rates, the invention is not limited in this regard and the link may be duty cycled utilizing three or more data rates. Additionally, although FIG. 3A depicts the data rate transitioning between data rates three times per time interval, the inventions is not so limited and may transition between data rates any number of times during a time interval.

During the exemplary time interval t1, data to be communicated over the link 112 may be generated at 25% of the maximum data rate supported by the link 112. Accordingly, the data rate of the link 112 may be zero for 75% of time interval t1 and may be 100% of the maximum data rate for 25% of time interval t1.

During the exemplary time interval t2, data to be communicated over the link 112 may be generated at 50% of the maximum data rate supported by the link 112. Accordingly, the data rate of the link 112 may be zero for 50% of time interval t2 and may be 100% of the maximum data rate for 50% of time interval t2.

During the exemplary time interval t3, data to be communicated over the link 112 may be generated at 75% of the maximum data rate supported by the link 112. Accordingly, the data rate of the link 112 may be zero for 25% of time interval t2 and may be 100% of the maximum data rate for 75% of time interval t3.

During the exemplary time interval t4, data to be communicated over the link 112 may be generated at 50% of the maximum data rate supported by the link 112. Accordingly, the data rate of the link 112 may be zero for 50% of time interval t4 and may be 100% of the maximum data rate for 50% of time interval t4.

During the exemplary time interval t5, data to be communicated over the link 112 may be generated at 25% of the maximum data rate supported by the link 112. Accordingly, during time interval t5, the data rate of the link 112 may be zero for 75% of time interval t5 and may be 100% of the maximum data rate for 25% of time interval t5.

Figure 3B:
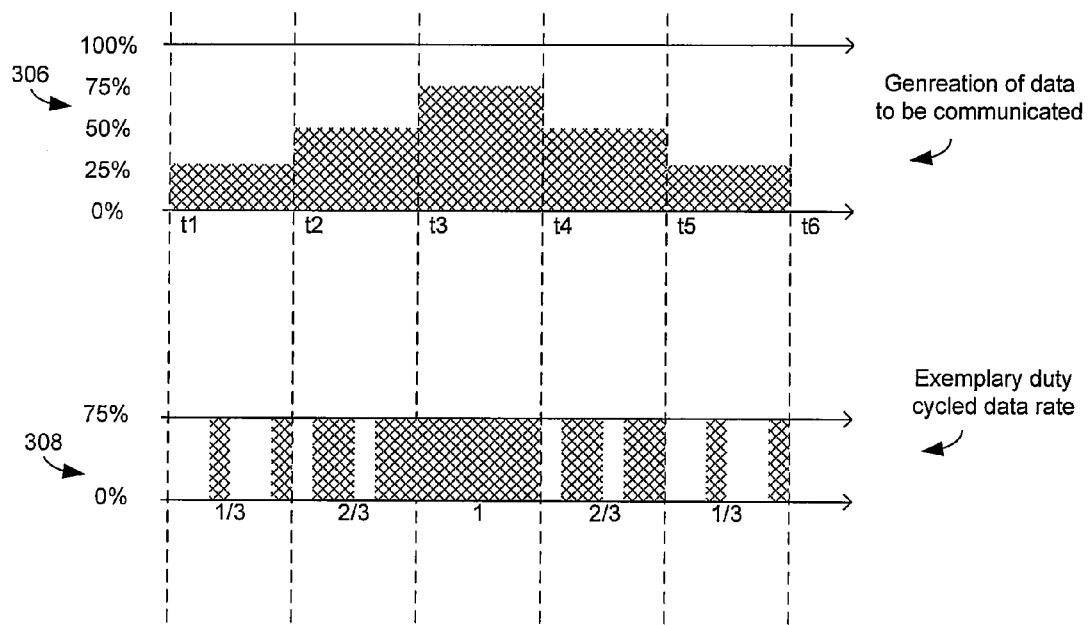
FIG. 3B is a diagram illustrating duty cycling a data rate of a network link between a zero data rate and an intermediate supported data rate of the link, in accordance with an embodiment of the invention.

FIG. 3B is a diagram illustrating duty cycling a data rate of a network link between a zero data rate and an intermediate supported data rate of the link, in accordance with an embodiment of the invention. Referring to FIG. 3B, there is shown a graph 306 depicting data being generated and a graph 308 depicting a corresponding duty cycled data rate on an associated link. The data may be generated in one or more nodes which may communicate over a common link, such as the nodes 102 and 104. Although FIG. 3B depicts the link 112 being duty cycled between two data rates, the invention is not limited in this regard and the link may be duty cycled utilizing three or more data rates. Additionally, although FIG. 3B depicts the data rate transitioning between data rates three times per time interval, the inventions is not so limited and may transition between data rates any number of times during a time interval.

The intermediate data rate may be determined based on the maximum rate, or maximum expected rate, at which data may be generated by nodes communicatively coupled to the link. In the exemplary embodiment of the invention depicted, the maximum rate at which data may be generated for communication over the link 112 may be 75%.

During the exemplary time interval t1, data to be communicated over the link 112 may be generated at 25% of the maximum data rate supported by the link 112. Accordingly, the data rate of the link 112 may be zero for 66⅓% of time interval t1 and may be 75% of the maximum data rate for 33⅓% of time interval t1.

During the exemplary time intervals t2, data to be communicated over the link 112 may be generated at 50% of the maximum data rate supported by the link 112. Accordingly, the data rate of the link 112 may be zero for 33⅓% of time interval t2 and may be 75% of the maximum data rate for 66⅓% of time interval t2.

During the exemplary time interval t3, data to be communicated over the link 112 may be generated at 75% of the maximum data rate supported by the link 112. Accordingly, the data rate of the link 112 may be 75% of the maximum data rate for the duration of time interval t3.

During the exemplary time intervals t4, data to be communicated over the link 112 may be generated at 50% of the maximum data rate supported by the link 112. Accordingly, during time interval t4, the data rate of the link 112 may be zero for 33⅓% of time interval t4 and may be 75% of the maximum data rate for 66⅓% of time interval t4.

During the exemplary time interval t5, data to be communicated over the link 112 may be generated at 25% of the maximum data rate supported by the link 112. Accordingly, the data rate of the link 112 may be zero for 66⅓% of time interval t5 and may be 75% of the maximum data rate for 33⅓% of time interval t5.

Figure 3C:
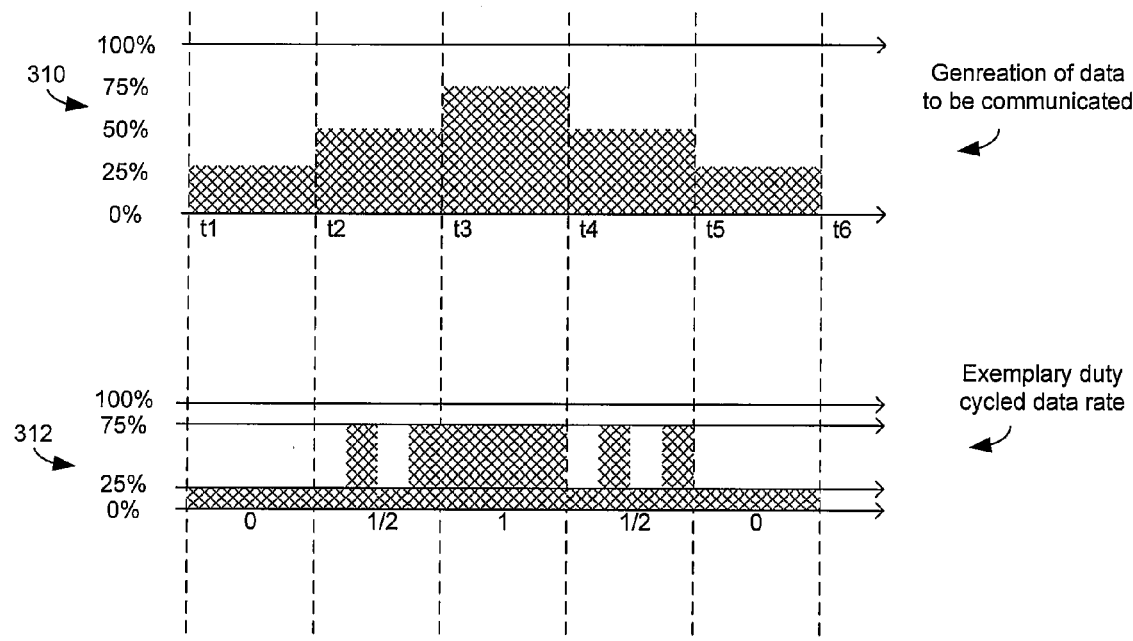
FIG. 3C is a diagram illustrating duty cycling a data rate of a network link between a first intermediate supported data rate of the link and a second intermediate supported data rate of the link, in accordance with an embodiment of the invention.

FIG. 3C is a diagram illustrating duty cycling a data rate of a network link between a first intermediate supported data rate of the link and a second intermediate supported data rate of the link, in accordance with an embodiment of the invention. Referring to FIG. 3C, there is shown a graph 310 depicting data being generated and a graph 312 depicting a corresponding duty cycled data rate on an associated link. The data may be generated in one or more nodes, which may communicate over a common link, such as the nodes 102 and 104. Although FIG. 3C depicts the link 112 being duty cycled between two data rates, the invention is not limited in this regard and the link may be duty cycled utilizing three or more data rates. Additionally, although FIG. 3C depicts the data rate transitioning between data rates three times per time interval, the inventions is not so limited and may transition between data rates any number of times during a time interval.

The first intermediate data rate may be determined based on the minimum rate, or minimum expected rate, at which data may be generated by nodes communicatively coupled to the link 112. In the exemplary embodiment of the invention depicted in FIG. 3C, the minimum rate at which data may be generated for communication over the link 112 may be 25%. Similarly, the second intermediate data rate may be determined based on the maximum rate at which data may be generated or expected to be generated by nodes communicatively coupled to the link 112. In the exemplary embodiment of the invention depicted, the maximum rate at which data may be generated for communication over the link 112 may be 75%.

During the exemplary time interval t1, data to be communicated over the link 112 may be generated at 25% of the maximum data rate supported by the link 112. Accordingly, the data rate of the link 112 may be 25% of the maximum data rate for the duration of time interval t1.

During the exemplary time intervals t2, data to be communicated over the link 112 may be generated at 50% of the maximum data rate supported by the link 112. Accordingly, the data rate of the link 112 may be 25% for 50% of time interval t2 and may be 75% of the maximum data rate for 50% of time interval t2.

During the exemplary time interval t3, data to be communicated over the link 112 may be generated at 75% of the maximum data rate supported by the link 112. Accordingly, the data rate of the link 112 may be 75% for the duration of time interval t3.

During the exemplary time intervals t4, data to be communicated over the link 112 may be generated at 50% of the maximum data rate supported by the link 112. Accordingly, the data rate of the link 112 may be 25% for 50% of time interval t4 and may be 75% of the maximum data rate for 50% of time interval t4.

During the exemplary time interval t5, data to be communicated over the link 112 may be generated at 25% of the maximum data rate supported by the link 112. Accordingly, the data rate of the link 112 may be 25% of the maximum data rate for the duration of time interval t5.

Figure 3D:
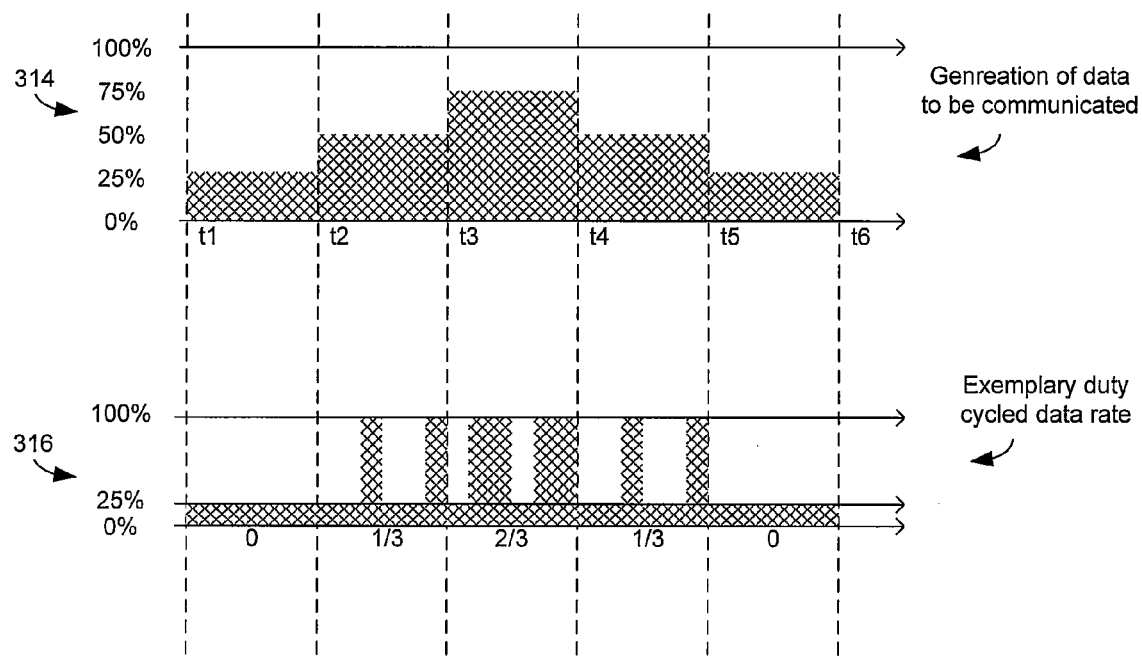
FIG. 3D is a diagram illustrating duty cycling a data rate of a network link between an intermediate supported data rate of the link and a maximum supported data rate of the link, in accordance with an embodiment of the invention.

FIG. 3D is a diagram illustrating duty cycling a data rate of a network link between an intermediate supported data rate of the link and a maximum supported data rate of the link, in accordance with an embodiment of the invention. Referring to FIG. 3D, there is shown a graph 314 depicting data being generated and a graph 316 depicting a corresponding duty cycled data rate on an associated link. The data may be generated in one or more nodes which may communicate over a common link, such as the nodes 102 and 104. Although FIG. 3D depicts the link 112 being duty cycled between two data rates, the invention is not limited in this regard and the link may be duty cycled utilizing three or more data rates. Additionally, although FIG. 3D depicts the data rate transitioning between data rates three times per time interval, the inventions is not so limited and may transition between data rates any number of times during a time interval.

The intermediate data rate may be determined based on the minimum rate, or minimum expected rate, at which data may be generated by nodes communicatively coupled to the link. In the exemplary embodiment of the invention depicted in FIG. 3D, the minimum rate at which data may be generated for communication over the link 112 may be 25%.

During time interval t1, data to be communicated over the link 112 may be generated at 25% of the maximum data rate supported by the link 112. Accordingly, the data rate of the link 112 may be 25% of the maximum data rate for the duration of time interval t1.

During the exemplary time interval t2, data to be communicated over the link 112 may be generated at 50% of the maximum data rate supported by the link 112. Accordingly, during time interval t2, the data rate of the link 112 may be 25% of the maximum supported data rate for 66⅓% of time interval t2 and may be 100% of the maximum data rate for 33⅓% of time interval t2.

During the exemplary time interval t3, data to be communicated over the link 112 may be generated at 75% of the maximum data rate supported by the link 112. Accordingly, the data rate of the link 112 may be 25% of the maximum data rate for 33⅓% of time interval t3 and may be 100% of the maximum supported data rate for 66⅓% of time interval t3.

During the exemplary time interval t4, data to be communicated over the link 112 may be generated at 50% of the maximum data rate supported by the link 112. Accordingly, the data rate of the link 112 may be 25% of the maximum supported data rate for 66⅓% of time interval t4 and may be 100% of the maximum data rate for 33⅓% of time interval t4.

During the exemplary time interval t5, data to be communicated over the link 112 may be generated at 25% of the maximum data rate supported by the link 112. Accordingly, the data rate of the link 112 may be 25% of the maximum data rate for the duration of time interval t5.

Figure 3E:
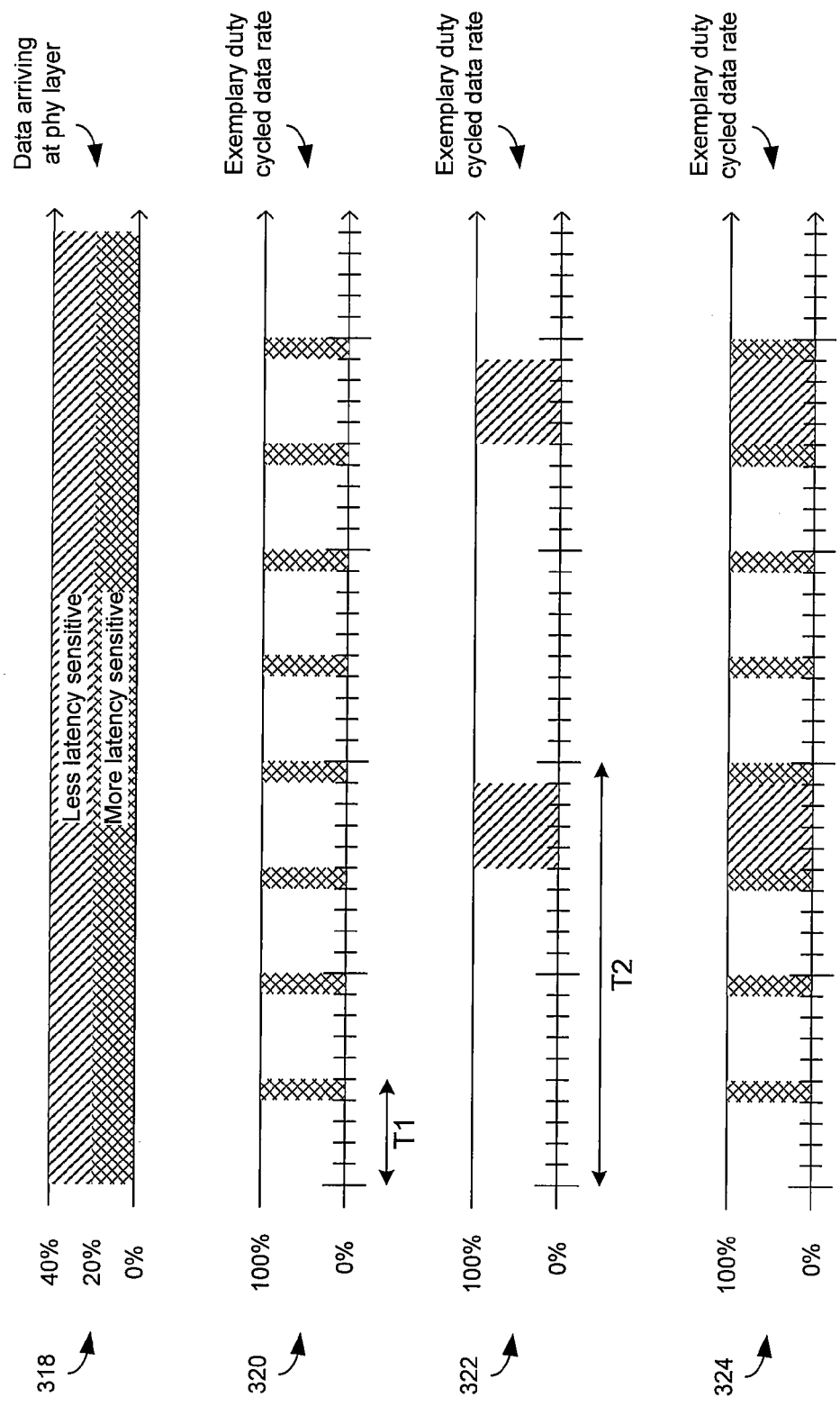
FIG. 3E is a diagram illustrating duty cycling a data rate of a network link which carries traffic with varying latency sensitivities, in accordance with an embodiment of the invention.

FIG. 3E is a diagram illustrating duty cycling a data rate of a network link which carries traffic with varying latency sensitivities, in accordance with an embodiment of the invention. Referring to FIG. 3 there is shown a graph 318 depicting data being generated and a graph 320 depicting a corresponding duty cycled data rate on an associated link. The data may be generated in one or more nodes which communicate over a common link, such as the nodes 102 and 104. The data may be generated in one or more nodes which may communicate over a common link, such as the nodes 102 and 104

As illustrated in graph 318, the data generated for communication over a network link may comprise data, such as a multimedia stream, that may be relatively sensitive to latency and data, such as general web traffic, that may be relatively insensitive to latency. As illustrated in graph 320, a first duty cycling, with period T1, may be utilized for communicating the latency sensitive traffic over a network link. As illustrated in graph 322, a second duty cycling, with period T2, may be utilized for communicating the latency insensitive traffic over a network link. In this manner, the latency sensitive traffic may be communicated in more frequent but shorter bursts whereas the latency insensitive traffic may be communicated in longer but less frequent bursts. Combining graphs 320 and 322 may thus result in graph 324 illustrating the duty cycling of a data rate to communicate traffic with varying latency tolerance over a common link.

Figure 4:
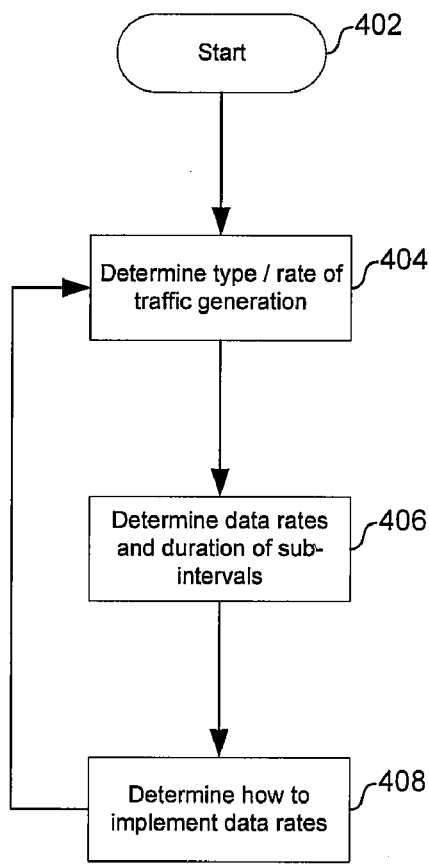
FIG. 4 is a flow chart illustrating exemplary steps for duty cycling a data rate of a network link, in accordance with an embodiment of the invention.

FIG. 4 is a flow chart illustrating exemplary steps for duty cycling a data rate of a network link, in accordance with an embodiment of the invention. Referring to FIG. 4, subsequent to start step 402 the exemplary steps may advance to step 404. In step 404, the nodes 102 and 104 communicatively coupled via the network link 102 may each determine an amount and/or type of data being generated for communication over the link 112. In this regard, the average data rate may be determined and/or predicted based, for example, on past traffic statistics and/or programs running on the nodes. Subsequent to step 404, the exemplary steps may advance to step 406.

In step 406, the nodes 102 and 104, may determine a duty cycling period based on a variety of factors such as the type of data being communicated on the link, a maximum data rate of the link, buffer sizes, and an amount of time it takes the nodes to transition between data rates. In this regard, controlling the data rates and the duty cycle period may enable achieving a wide range of average data rates with great resolution. For example, the average data rate over a time interval T1 may be determined as follows:

$$\overline{D} = \frac{t_{1a}}{T1} D_{1a} + \frac{t_{1b}}{T1} D_{1b}$$

where $\overline{D}$ is the average data rate of the link during the interval T1, $D_{1a}$ is the data rate on the link during a first portion, t1a, of the time interval T1 and D1b is the data rate on the link during a remaining portion, t1b, of the time interval T1.

In step 408, it may be determined how to achieve the data rates determined in step 406. In this regard, exemplary techniques for controlling the data rate may comprise one or more of adjusting a number of active physical channels on the link 112, adjusting a signal constellation utilized for representing data on the link 112, reducing the number of PAM levels utilized for signaling on the link 112, adjusting the interframe gap (IFG), and adjusting a symbol rate on the link 112. Subsequent to step 408, the exemplary steps may return to step 404.

Exemplary aspects of a method and system for supporting a variable and energy efficient data rate using a duty cycling technique and multiple power states on an Ethernet link are provided. In various embodiments of the invention, a data rate on a network link 112 may be duty cycled based on characteristics of data communicated over it such that data may be communicated over the link at a first data rate for a first portion of a specified time interval and may be communicated over the link at a second data rate for a second portion of the specified time interval. The duration of each portion of the time interval and/or the data rate during each portion of the time interval may be adjusted to control the duty cycling. Exemplary characteristics may comprise an amount of, a type of, and/or an application associated with, the data communicated over the network. The first data rate may be a zero data rate. The second data rate may be a maximum data rate supported by the network link. The data rate may be controlled by adjusting one or more of a number of active physical channels in the network link, a signal constellation utilized for representing data on the network link, a number of pulse amplitude modulation levels utilized for signaling on the network link, and one or more inter-frame gaps on the network link. Power consumed in a device connected to the network link may be controlled based on the duty cycling of the link. In this regard, various components in the device may be powered up and/or down during the first and/or second portions of the time interval.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for supporting a variable and energy efficient data rate using a duty cycling technique and multiple power states on an Ethernet link.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for data communications in a network between a first network node and a second network node over a network link, the first network node having a first host, a first media access control (MAC) and a first physical layer (PHY), the method comprising:

cycling a transmit data rate at which said first PHY transmits first host data over said network link between a first non-zero data rate and at least a second non-zero data rate, wherein said first host data are obtained from said first host and processed by said first MAC and then said first PHY prior to said first PHY transmitting said first host data over said network link to said second network node; and cycling a receive data rate at which said first PHY receives second host data over said network link between said first non-zero data rate and said at least a second non-zero data rate being different than said first non-zero data rate, wherein said second host data are processed by said first PHY after being received by said first PHY and then by said first MAC prior to being provided to said first host;

wherein a duty cycle of said transmit data is determined based on one or both of: a type of said first host data communicated over said network link and a type of said first host data to be communicated over said network link; and wherein said transmit data rate and said receive data rate are controlled by varying a number of physical channels of said network link via which data are communicated.

2. The method according to claim 1, wherein a duty cycle of said receive data rate is determined based on one or both of: a type of said second host data communicated over said network link and a type of said second host data to be communicated over said network link, wherein said duty cycle of said transmit data rate is different than said duty cycle of said receive data rate.

3. The method according to claim 1, wherein said at least a second non-zero data rate is a maximum data rate supported by said network link.

4. The method according to claim 1, comprising controlling power in said first PHY and said first MAC based on said cycling of said transmit data rate on said network link and said cycling of said receive data rate on said network link.

5. The method according to claim 4, comprising powering down one or more components of said first PHY and said first MAC while communicating over said network link at said first non-zero data rate.

6. The method according to claim 1, comprising determining said duty cycle of said transmit data rate and said duty cycle of said receive data rate based on:
one or more software programs that are associated with said first host data communicated and/or to be communicated over said network link.

7. The method according to claim 1, comprising determining one or both of: said first non-zero data rate and said at least a second nonzero data rate based on one or more of: an amount of said first host data communicated over said network link, a type of said first host data communicated over said network link, an amount of said first host data to be communicated over said network link, and a type of said first host data to be communicated over said network link.

8. The method according to claim 1, comprising determining one or both of: said first non-zero data rate and said at least a second non-zero data rate based on one or more software programs that are associated with one or both of: said first host data communicated over said network link and said first host data to be communicated over said network link.

9. The method according to claim 1, comprising controlling one or both of said transmit data rate and said receive data rate by adjusting one or more of: a signal constellation utilized for representing first host data on said network link, a number of pulse amplitude modulation levels utilized for signaling on said network link, and one or more inter-frame gaps on said network link.

10. The method according to claim 1, wherein a period of said duty cycle of said transmit data rate is determined based on one or both of: latency sensitivity of said type of said first host data communicated over said network link and latency sensitivity of said type of said first host data to be communicated over said network link.

11. A system networking, the system comprising:
one or more circuits, one or more processors, or a combination of one or more circuits and one or more processors operable to:
cycle a transmit data rate at which a first physical layer (PHY transmits first host data over a network link between a first non-zero data rate and at least a second non-zero data rate, wherein said first host data are obtained from a first host and processed by a first media access control (MAC) and then said first PHY prior to said first PHY transmitting said first host data over a network link; and cycle a receive data rate at which said first PHY receives second host data over said network link between said first non-zero data rate and said at least a second non-zero data rate being different than said first non-zero data rate, wherein said second host data are processed by said first PHY after being received by said first PHY and then by said first MAC prior to being provided to said first host;

wherein a duty cycle of said transmit data rate is determined based on one or both of: a type of said first host data communicated over said network link and a type of said first host data to be communicated over said network link; and wherein said transmit data rate and said receive data rate are controlled by varying a number of physical channels of said network link via which data are communicated.

12. The system according to claim 11, wherein a duty cycle of said receive data rate is determined based on one or both of: a type of said second host data communicated over said network link and a type of said second host data to be communicated over said network link, wherein said duty cycle of said transmit data rate is different than said duty cycle of said receive data rate.

13. The system according to claim 11, wherein said at least a second non-zero data rate is a maximum data rate supported by said network link.

14. The system according to claim 11, wherein said one or more circuits, one or more processors, or combination of one or more circuits and one or more processors are operable to control power in said first PRY and said first MAC based on said cycling of said transmit data rate on said network link and said cycling of said receive data rate on said network link.

15. The system according to claim 14, wherein said one or more circuits one or more processors, or combination of one or more circuits and one or more processors are operable to power down one or more components of said first PHY and said first MAC while communicating over said network link at said first nonzero data rate.

16. The system according to claim 11, wherein said one or more circuits, one or more processors, or combination of one or more circuits and one or more processors are operable to determine said duty cycle of said transmit data rate and said duty cycle of said receive data rate based on:
one or more software programs that are associated with said first host data communicated and/or to be communicated over said network link.

17. The system according to claim 11, wherein said one or more circuits, one or more processors, or combination of one or more circuits and one or more processors are operable to determine one or both of: said first non-zero data rate and said at least a second non-zero data rate based on one or more of: an amount of said first host data communicated over said network link, a type of said first host data communicated over said network link, an amount of said first host data to be communicated over said network link, and a type of said first host data to be communicated over said network link.

18. The system according to claim 11, wherein said one or more circuits, one or more processors, or combination of one or more circuits and one or more processors are operable to determine one or both of said first non-zero data rate and said at least a second non-zero data rate based on one or more software programs that are associated with one or both of: said first host data communicated over said network link and said first host data to be communicated over said network link.

19. The system according to claim 11, wherein said one or more circuits, one or more processors, or combination of one or more circuits and one or more processors are operable to control one or both of said transmit data rate and said receive data rate by adjusting one or more of: a signal constellation utilized for representing first host data on said network link, a number of pulse amplitude modulation levels utilized for signaling on said network link, and one or more inter-frame gaps on said network link.

20. The system according to claim 11, wherein a period of said duty cycle of said transmit data rate is determined based on one or both of: latency sensitivity of said type of said first host data communicated over said network link and latency sensitivity of said type of said first host data to be communicated over said network link.

* * * * *